(12) United States Patent
Braca et al.

(10) Patent No.: US 10,093,422 B2
(45) Date of Patent: Oct. 9, 2018

(54) ASSEMBLY OF AIRPLANE SEATS

(71) Applicant: OPTIMARES S.P.A., Sezze Scalo Latium (IT)

(72) Inventors: Alessandro Braca, Sezze Scalo (IT); Alessio Morsicani, Sezze Scalo (IT); Andrea Giordano, Sezze Scalo (IT)

(73) Assignee: OPTIMARES S.P.A., Sezze Scalo (LT) (IT)

( * ) Notice: Subject to any disclaimer, the term of this patent is extended or adjusted under 35 U.S.C. 154(b) by 14 days.

(21) Appl. No.: 15/230,323

(22) Filed: Aug. 5, 2016

(65) Prior Publication Data

US 2017/0036765 A1 Feb. 9, 2017

(30) Foreign Application Priority Data

Aug. 7, 2015 (IT) .................................. 10201543306

(51) Int. Cl.
*B64D 11/06* (2006.01)
*B64D 11/00* (2006.01)

(52) U.S. Cl.
CPC .... *B64D 11/0601* (2014.12); *B64D 11/00153* (2014.12); *B64D 11/064* (2014.12);
(Continued)

(58) Field of Classification Search
CPC .......... B64D 11/0601; B64D 11/00153; B64D 11/0606; B64D 11/0638; B64D 11/0639;
(Continued)

(56) References Cited

U.S. PATENT DOCUMENTS 4,936,620 A * 6/1990 Francois ................ B64D 11/00
　　　　　　　　　　　　　　　　　　　　　　　　　　105/345
9,315,270 B2 * 4/2016 Dryburgh ........... B64D 11/0601
(Continued)

FOREIGN PATENT DOCUMENTS

EP　　　　2010030 B1　　3/2013
WO　WO 2012/140515 A1　10/2012
(Continued)

OTHER PUBLICATIONS

Search Report dated Apr. 12, 2016 and Written Opinion issued by the Italian Patent Office in related Italian Application No. 102015000043306.

*Primary Examiner* — Philip F Gabler
(74) *Attorney, Agent, or Firm* — Hershkovitz & Associates, PLLC; Abe Hershkovitz

(57) ABSTRACT

The present invention relates to an assembly (1) of seats (2', 3', 2'', 3'') for airplanes, said assembly (1) comprising at least two rows (4', 4'') of pairs of adjacent seats (2', 3'; 2'', 3''), each seat (2'; 3'; 2''; 3'') comprising one seatback (5), one sitting portion (6), and an element (7) for the support of the lower limbs, each seat (2'; 3'; 2''; 3'') being configured in order to make a reclining movement along a respective recline axis ($r_2$; $r_3$; $r_{2''}$; $r_{3''}$) between a sitting position, wherein at least said seatback (5) and said sitting portion (6) cooperate in order to form a sitting element, and an extended position, wherein said seatback (5), said sitting portion (6) and said element (7) cooperate in order to form a bed surface, and vice versa, each seat (2'; 3'; 2''; 3'') being tilted in respect to the adjacent seat (3'; 2'; 3''; 2'') of a first angle ($\alpha'$; $\alpha''$) obtained by the intersection of the respective recline axis ($r_{2'}$, $r_{3'}$; $r_{2''}$, $r_{3''}$) in a convergence point (A'; A'') arranged rearward said pair of adjacent seats (2', 3'; 2'', 3''), at least a first seat (2'; 3') of a first row (4') being separated from the seat (2''; 3'') of the second row (4'') arranged in front to it
(Continued)

so that, both when both are in sitting position and when both are in extended position, there is always at least a space (8) between them (2' and 2"; 3' and 3") for the passage of a passenger in order to access the adjacent seat (3'; 2') to said at least one first seat (2'; 3') of said first row (4'). The present invention further relates to the arrangement of said assembly (1) of seats (2', 3'; 2", 3") within an airplane cabin (100).

20 Claims, 6 Drawing Sheets

(52) U.S. Cl.
CPC ...... B64D 11/0606 (2014.12); B64D 11/0638 (2014.12); B64D 11/0639 (2014.12); B64D 11/0641 (2014.12); B64D 11/0646 (2014.12)

(58) Field of Classification Search
CPC .............. B64D 11/064; B64D 11/0641; B64D 11/0646
See application file for complete search history.

(56) References Cited

U.S. PATENT DOCUMENTS

| | | | |
|---|---|---|---|
| 9,446,848 B2 * | 9/2016 | Jerome | B60N 2/34 |
| 2012/0223186 A1 | 9/2012 | Henshaw | |
| 2012/0223557 A1 | 9/2012 | Henshaw | |
| 2012/0292957 A1 * | 11/2012 | Vergnaud | B64D 11/06 297/188.08 |
| 2013/0032668 A1 | 2/2013 | Foucher et al. | |
| 2013/0068887 A1 * | 3/2013 | Ko | B64D 11/06 244/118.6 |
| 2013/0106156 A1 * | 5/2013 | Orson | B64D 11/06 297/217.3 |
| 2014/0306500 A1 | 10/2014 | Dryburgh et al. | |
| 2015/0069805 A1 | 3/2015 | Henshaw | |
| 2015/0166184 A1 * | 6/2015 | Dryburgh | B64D 11/06 244/118.6 |

FOREIGN PATENT DOCUMENTS

| | | |
|---|---|---|
| WO | WO 2014/049362 A1 | 4/2014 |
| WO | WO 2015/083086 A1 | 6/2015 |

* cited by examiner

ASSEMBLY OF AIRPLANE SEATS

The present invention relates to an assembly of seats for airplane. This assembly of seats could also be used in other environments, such as for example other means of transportation, such as trains, or in the waiting rooms where there are available rather narrow spaces but it is necessary to ensure comfort for the waiting users.

More precisely, the present invention relates to an assembly for reclining seats of the type suitable for long distance travel, in particular for the aircraft business class. These seats allow passengers to take both a reclined/seating position or an extended/bed position for extra comfort while sleeping, and an intermediate position between the two.

Seats of the above kind are known, which, however, have the disadvantage of being bulky, so as to occupy more space than necessary, resulting in a less efficient use of the available area.

Furthermore, other solutions, such as the assembly of seats described in the European Patent EP 2010030 B1, although able to ensure a more efficient use of the available spaces, reduce the comfort of passengers. Particularly, when putting two seats side by side in the area adjacent to the window, the passenger sitting at the window, in order to have access to the aisle needs to invade the space of the passenger sitting in the next chair. Particularly, when the passenger sitting in the adjacent seat is in the extended or bed position, the passenger of the window seat is forced to climb over it, causing discomfort to both, either for the difficulty of one to accomplish a smooth movement to pass from his/her aisle seat, and for the discomfort necessarily caused to the passenger in the bed position, which probably is resting.

The object of the present invention is to maximize the efficient use of cabin space of an airplane and, at the same time, to guarantee comfort and convenience to the passengers, by an economic and easy to install solution.

It is an object of the present invention an assembly of seats for airplanes, said assembly comprising at least two rows of pairs of adjacent seats, each seat comprising one seatback, one sitting portion, and an element for the support of the lower limbs, each seat being configured in order to make a reclining movement along a respective recline axis between a sitting position, wherein at least said seatback and said sitting portion cooperate in order to form a sitting element, and an extended position, wherein said seatback, said sitting portion and said element cooperate in order to form a bed surface, and vice versa, each seat being tilted in respect to the adjacent seat of a first angle obtained by the intersection of the respective recline axis in a convergence point arranged rearward said pair of adjacent seats, at least a first seat of a first row being separated from the seat of the second row arranged in front to it so that, both when both are in sitting position and when both are in extended position, there is always at least a space between them for the passage of a passenger in order to access the adjacent seat to said at least one first seat of said first row.

Particularly, according to the invention, said first angle can be comprised between 1° and 25°, preferably equal to 12°.

Always according to the invention, said at least one first seat can be in extended position, the distance between said element for the support of the lower limbs of said at least a first seat and said seat of said second row arranged in front of it, can be comprised at least between 4 and 12 inches, preferably 7 inches.

Still according to the invention, said element for the support of the lower limbs of each seat can be is coupled to the respective sitting portion and can be pulled out in order to assume the position of maximum extraction when the respective seat is in the extended position.

Alternatively, according to the invention, said element for the support of the lower limbs of each seat can comprise a foot-rest portion separated and conveniently distanced from said seat portion so that when said seat is in the extended position, said seat portion and said foot-rest portion cooperate in order to form said bed surface.

Particularly, according to the invention, said element for the support of the lower limbs of each seat can comprise a legs-rest portion coupled to said seat portion, said leg-rest portion having a dimension so as to occupy the space between said seat portion and said foot-rest portion allowing to the respective seat to assume the bed surface.

Further, according to the invention, said foot-rest portion can have an element for the support of a monitor.

Preferably, according to the invention, each pair of adjacent seats of said second row can have a common platform on top of which said seats lie and in said foot-rest portions of the seats of said first rear row can be coupled to said platform.

Always according to the invention, between said pairs of adjacent seats of a same row it can be arranged a central element having a substantially triangular shape having the apex facing said convergence point of the respective recline axes of the respective pair of adjacent seats.

Particularly, according to the invention, said central element can be suitable for being used as an armrest for both said adjacent seats and/or can contain an extractable table for each seat of said adjacent seats.

Still according to the invention, each row of seats can comprise a dividing wall arranged rearward said pair of seats.

Further, it is an object of the present invention an arrangement of airplane seats inside an airplane cabin, said cabin having a longitudinal axis and two window sidewalls, said arrangement comprising an assembly of seats as described in the above, wherein the bisecting line of said first angle between the respective recline axes of said pair of adjacent seats of each row is parallel to the longitudinal axis of said cabin.

Still, it is an object of the present invention an arrangement of airplane seats inside an airplane cabin, said cabin having a longitudinal axis and two window sidewalls, said arrangement comprising an assembly of seats as described in the above, wherein the bisecting line of said first angle between the respective recline axes of said pair of adjacent seats of each row is tilted with respect to the longitudinal axis of said cabin of a second angle comprised between 2° and 20°, preferably equal to 8°.

Particularly, according to the invention, said assembly of seats can be arranged in correspondence of one or both the windows sidewalls of said cabin forming a side column of seats.

Still according to the invention, said arrangement can further comprise a central column of seats comprising a plurality of rows of pairs of adjacent seats in order to form a central aisle between each respective side and central column of seats, each seat comprising one seatback, one sitting portion, and an element for the support of the lower limbs, each seat being configured in order to make a reclining movement along a respective recline axis between a sitting position, wherein at least said seatback and said sitting portion cooperate in order to form a sitting element, and an extended position, wherein said seatback, said sitting portion and said element cooperate in order to form a bed surface, and vice versa, each seat being tilted with respect to the adjacent seat of a first angle obtained by the intersection of the respective recline axes in a convergence point arranged rearward to said pair of adjacent seats.

The invention will be now described, for illustrative but not limitative purposes, with particular reference to the figures of the accompanying drawings, in which.

Figure 1:
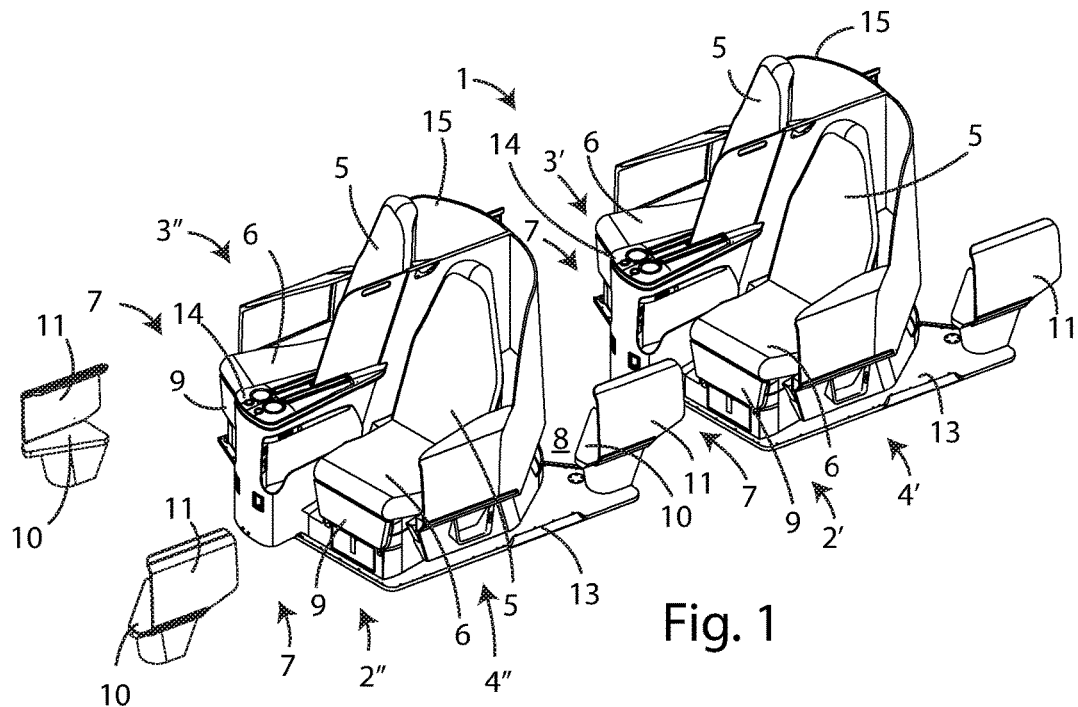
FIG. 1 shows a front perspective view of a first embodiment of an assembly of seats according to the invention.
Figure 2:
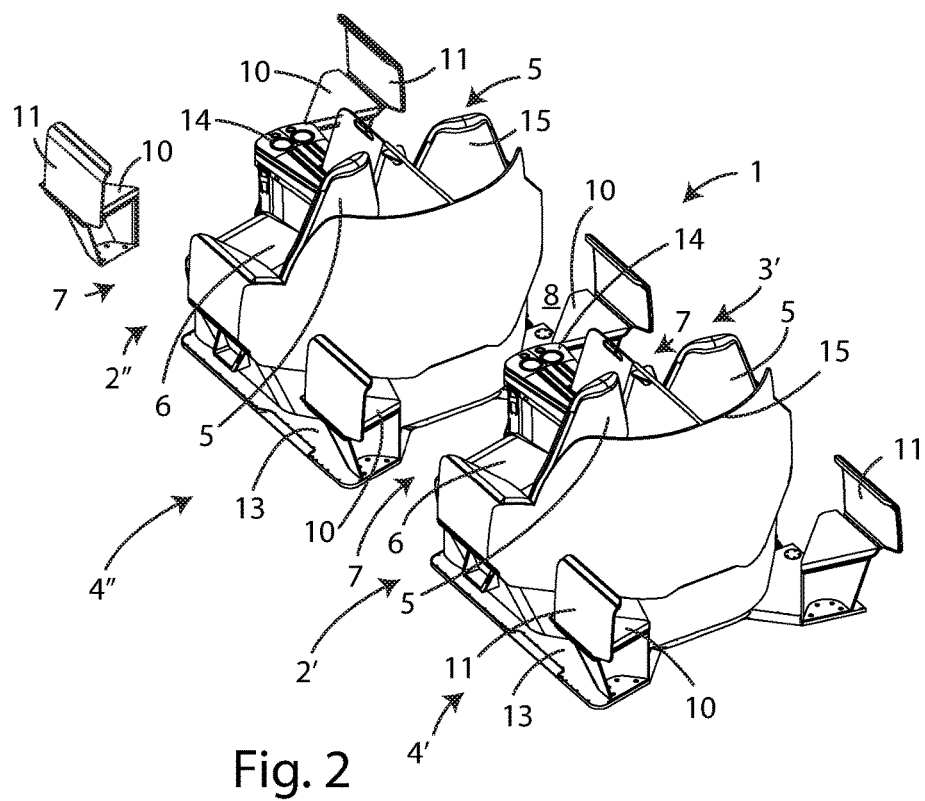
FIG. 2 shows a rear perspective view of the assembly of FIG. 1.

Making reference to FIGS. 1-6, it is observed an assembly of seats for airplane according to the invention indicated by the reference number 1.

In the embodiment shown in the figures, said assembly 1 comprises two rows 4' and 4" of pairs of adjacent seats 2' and 3', 2" and 3", a first row or the rear row 4' and a second row or the front row 4", however in other embodiments may be provided a greater number of rows of seats.

Each seat 2', 3', 2", 3" includes a backrest 5, a seat 6, coupled to the backrest 5, and an element 7 for supporting the lower limbs, and is configured so as to fulfill a reclining movement along a respective recline axis r2', r3', r2', r3" (shown in FIG. 3), between a sitting position, in which at least said backrest 5 and said seat 6 cooperate to form said seat portion of a seat element (as shown in FIGS. 1-6), and an extended position, in which said backrest 5, said seat portion 6 and said element 7 cooperate to form a bed surface (shown in FIGS. 7-9), and vice versa.

Figure 9:
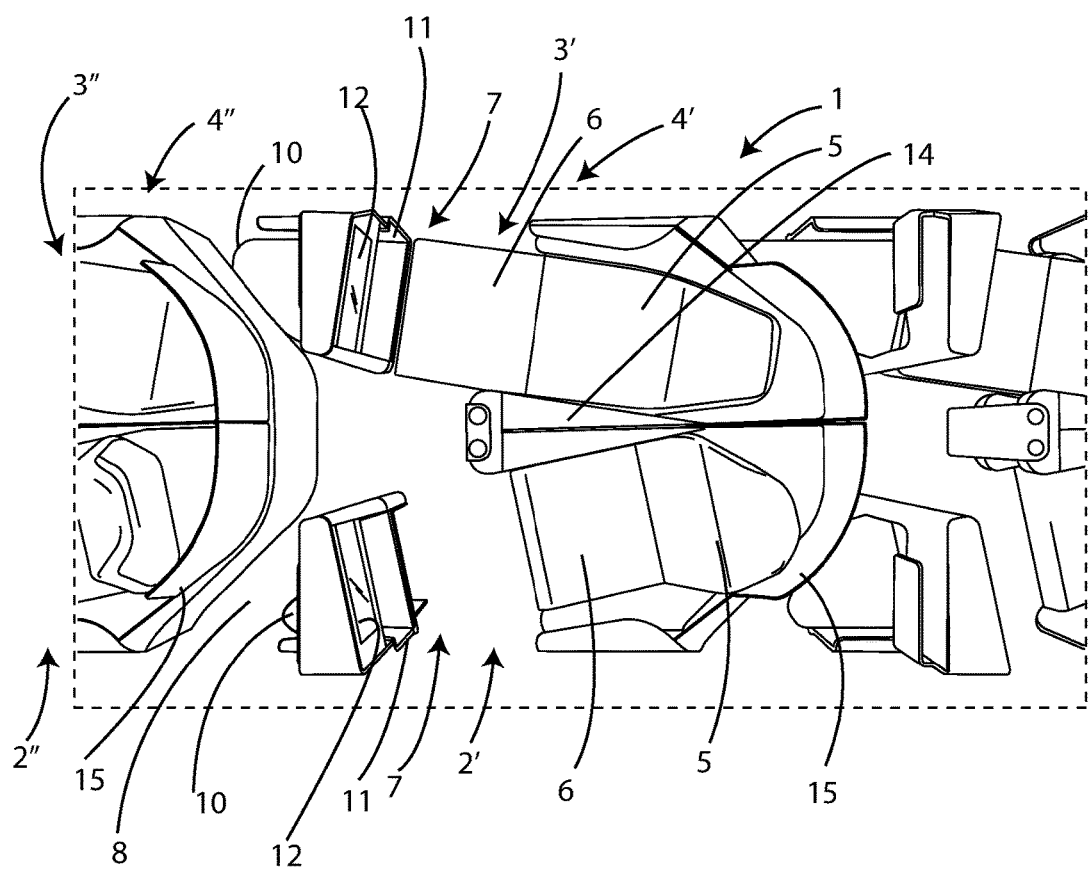
FIG. 9 shows a top perspective view of a second assembly of seats according to the invention.

In the specific embodiment of the element 7 to support of the lower limbs, it comprises a portion legs-rests 9 coupled to the seat 6, and a foot-rest element 10 separated and suitably spaced from the seat 6, in such a way that when said seat 2', 3', 2", 3" is in the extended position, said portion of legs-rest 9 occupies the space between said seat 6 and said foot-rest 10, allowing said chair to take over the bed position. The legs-rest 9 portion may also not be provided, such as shown in the embodiment of FIG. 9, where in the extended position said seat portion 6 is located directly in contact with said foot-rest portion 10 to form the bed.

In other embodiments (not shown), said element for supporting the lower limbs can be coupled to the respective seat and removable so as to assume the position of maximum extension when the respective seat is in the extended or bed position.

Figure 3:
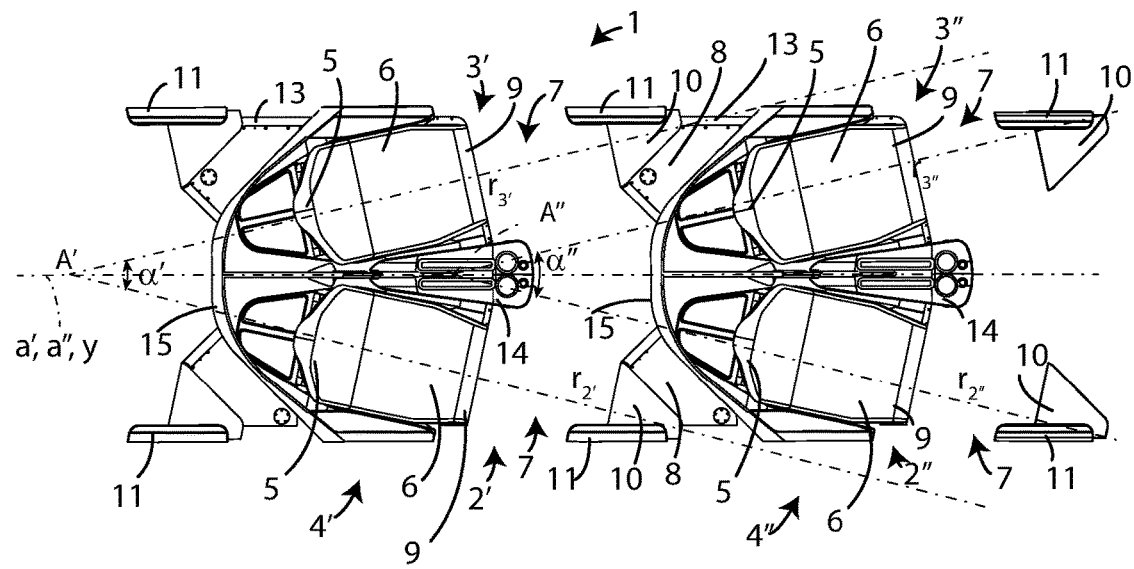
FIG. 3 shows a top view of the assembly of FIG. 1.
Figure 4:
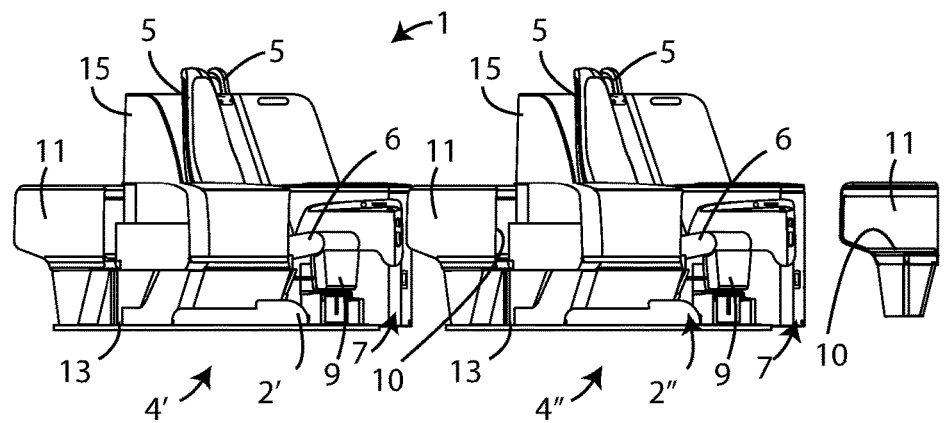
FIG. 4 shows a side view of the assembly of FIG. 1.
Figure 5:
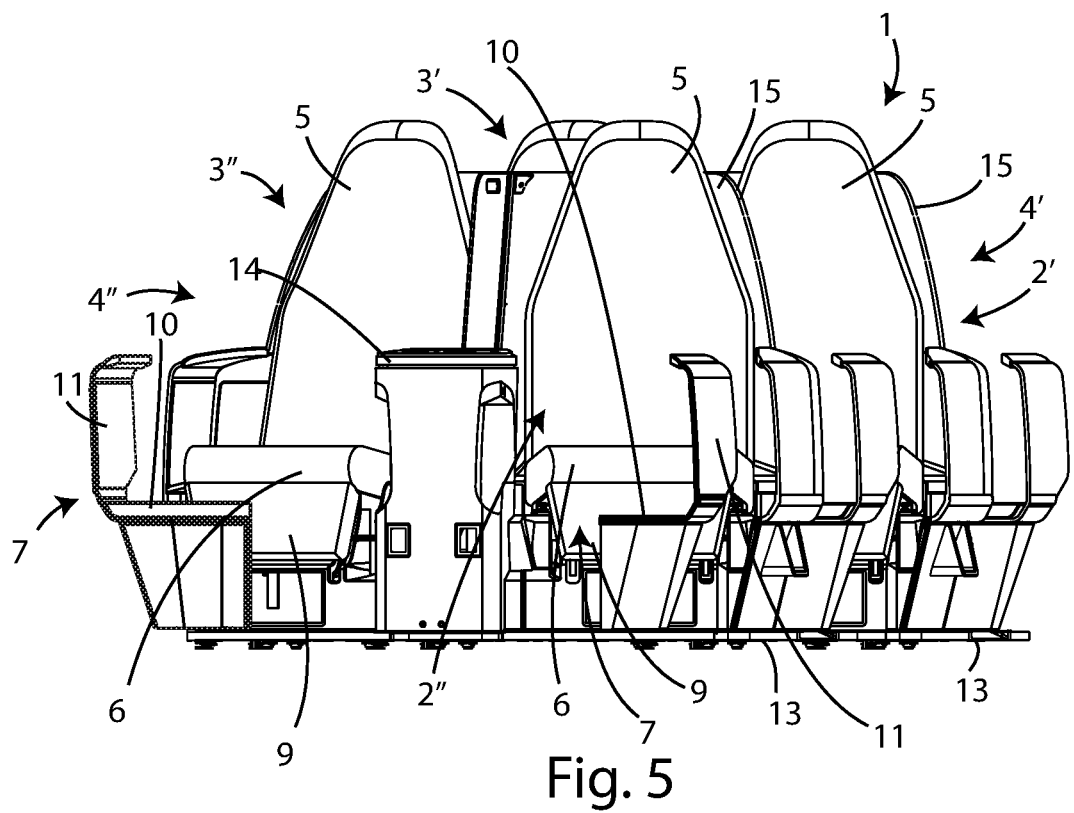
FIG. 5 shows a front view of the assembly of FIG. 1.
Figure 6:
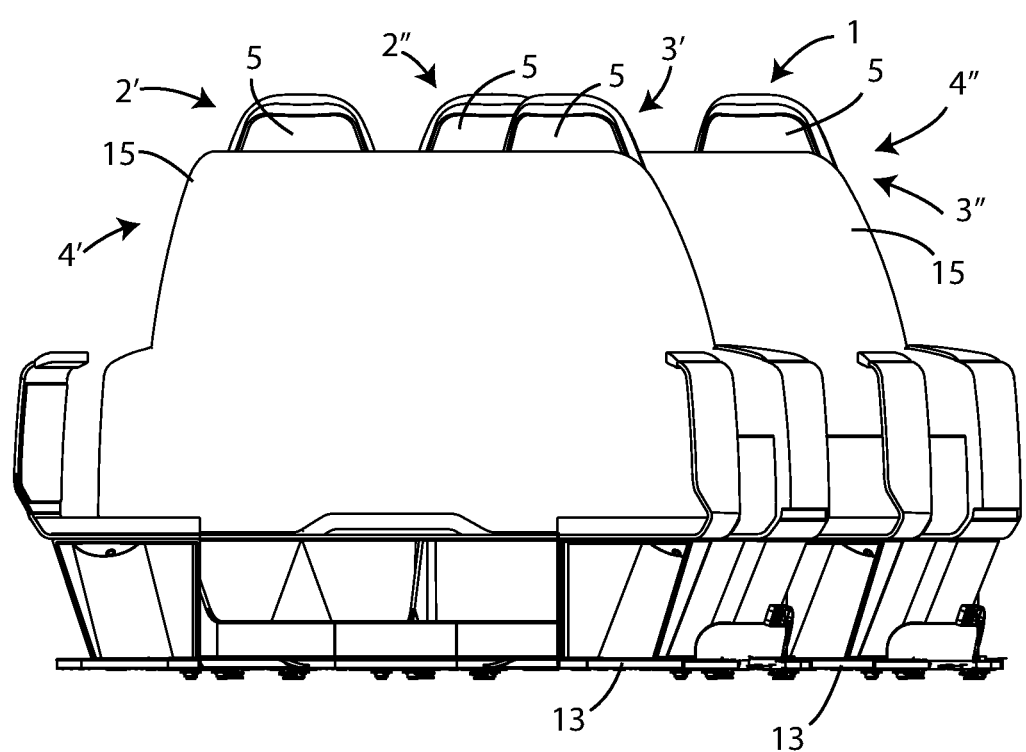
FIG. 6 shows a rear view of the assembly of FIG. 1.

Furthermore, according to the invention, as can be observed in particular from FIG. 3, each seat 2', 3', 2", 3" is oriented with respect to the adjacent seat 3', 2', 3", 2" of a first angle $\alpha'$ or $\alpha''$ obtained by the intersection of the respective axes of recline r2'-r3' and r2"-r3 in a convergence point A" or A" located behind said pair of adjacent seats 2' and 3', 2" and 3". This orientation of the seats means that when a passenger is sitting on one of those chairs 2', 3', 2", 3", it has the face facing outside the assembly 1.

Said first angle $\alpha'$ or $\alpha''$ may be between 1° and 25°, and is preferably equivalent to 12°. further, the divergence angle $\alpha'$ between the pair of seats 2'-3' of a first row 4' may differ with respect to the angle $\alpha''$ of divergence between the pair of seats 2"-3" of the second row 4".

Still according to the invention, as can be always noted in FIG. 3, each chair 2', 3' of the first row 4'is spaced from the chair 2", 3" of the second row 4" arranged in front of the same in such a way that, either when both are in the sitting position and when both are in the extended position, there is always at least one space 8 between them 2' and 2", 3' and 3" for the passage of a passenger to reach the adjacent seat 3', 2' of said first row 4'.

Figure 8:
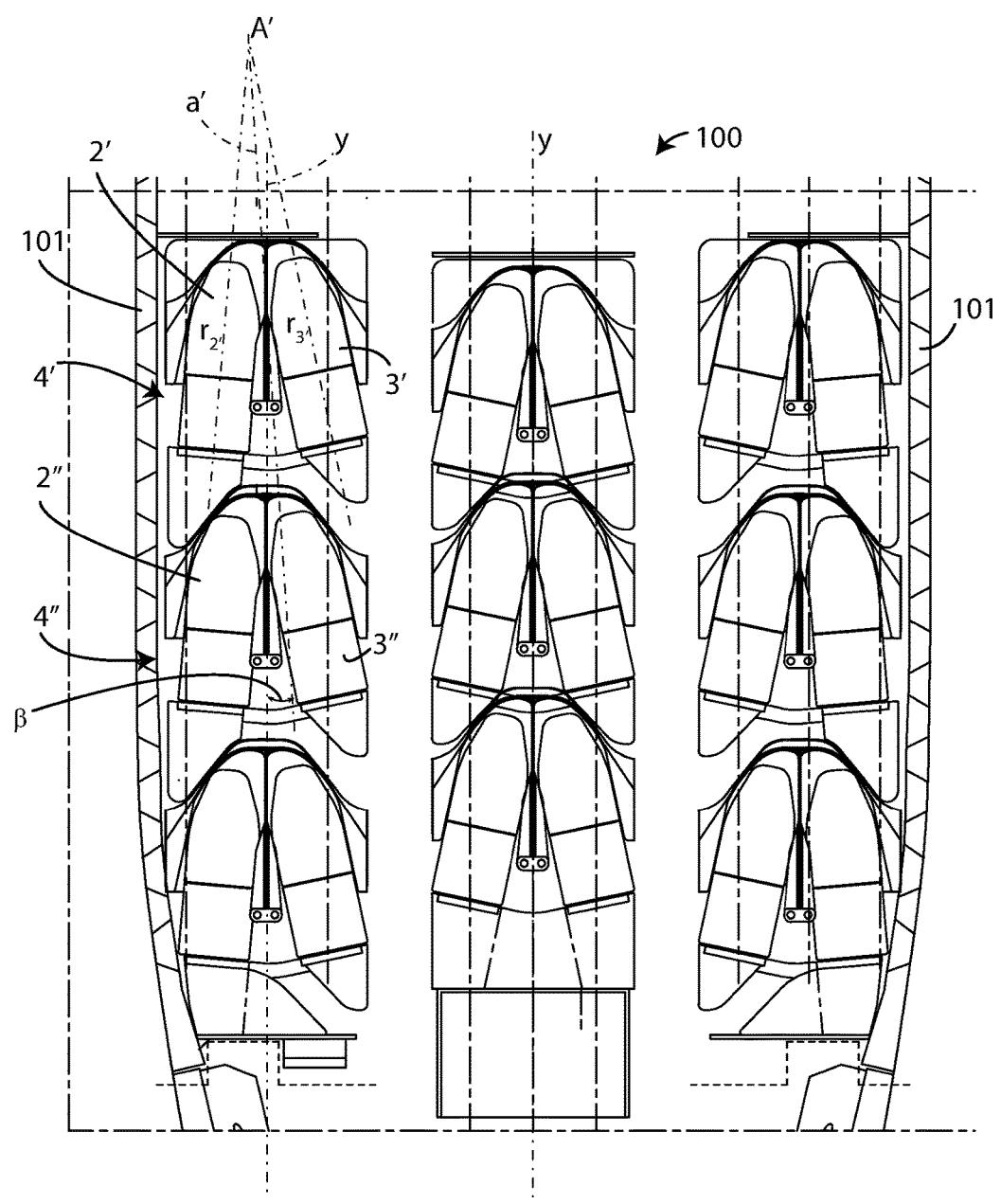
FIG. 8 shows a top view of a second example of the assembly arrangement according to the invention the whole of a cabin of an aircraft.

In other embodiments, such as those shown in FIG. 8 or 9, even only one seat 2' and 2" of each pair of adjacent seats 2'-3' and 2"-3" has such a space 8, which allows the passage of a passenger in the adjacent seat 3' and 3", positioned in the window area.

In particular, when the chair 2', 3' of a first row 4' is in the extended position, in correspondence of said space 8, the distance dx between said element 7 for the support of the lower extremities of said at least one first seat 2', 3' and said seat 2", 3" of said second row 4" arranged in front of the same can be comprised at least between 4 and 12 inches, preferably 7 inches.

The realization of this space 8 advantageously ensures comfort to passengers sitting in adjacent seats at the window, allowing them to reach their own seat from the aisle, and vice versa, without having to disturb the passenger sitting in the next seat.

Furthermore, the assembly according to the invention allows an efficient use of the available spaces, being able to have a high density of the seats, with a lesser impact on the passenger comfort.

As shown in FIGS. 1-6, when said element 7 for the support of the lower limbs has a foot rest 10 separated from the seat 6, and possibly from the legs-rest 9 portion, the assembly 1 may provide a platform 13 on which a respective pair of adjacent seats 2', 3' of a first row 4' and the foot rest 10 of the seats 2", 3" of the second row 4" rest.

This allows a more advantageous assembly of seat assembly 1 according to the invention.

In addition, between each pair of seats 2'-3' and 2"-3" adjacent in the same row 4' and 4" a substantially triangular shaped central element 14 can be provided having the apex directed toward said convergence point A' or A" of the recline axis r2'-r3' and r2"-r3" of the respective pair of adjacent seats 2'-3' and 2"-3". Said central element 14 can be used as an armrest for both said adjacent seats 2'-3' and 2"-3" and/or can contain a removable table for each seat 2', 3', 2", 3".

To obtain a greater separation between rows 4' and 4" of adjacent seats it can be provided a partition wall 15, arranged at the rear in each pair of adjacent seats 2'-3' or 2"-3". This partition wall 15 defines the maximum dimensions at rear of said seats when they are in the extended position and facilitates the passage of the passengers of the seats of the rear row 4', without even disturbing the passengers of the front row 4".

Observing the embodiment of FIG. 9, when said element 7 for the support of the lower limbs has a foot rest 10 separated from the seat 6, a portion of the foot rest 10 may include a support 11 for supporting a monitor 12. The monitor 12 is supported at a height that is convenient for the passenger, and so as not to interfere with the space dedicated to the lower limbs of the passenger, so that either in the sitting position, and in the extended position he/she has the opportunity to rest the foot on the footrest 10.

Figure 7:
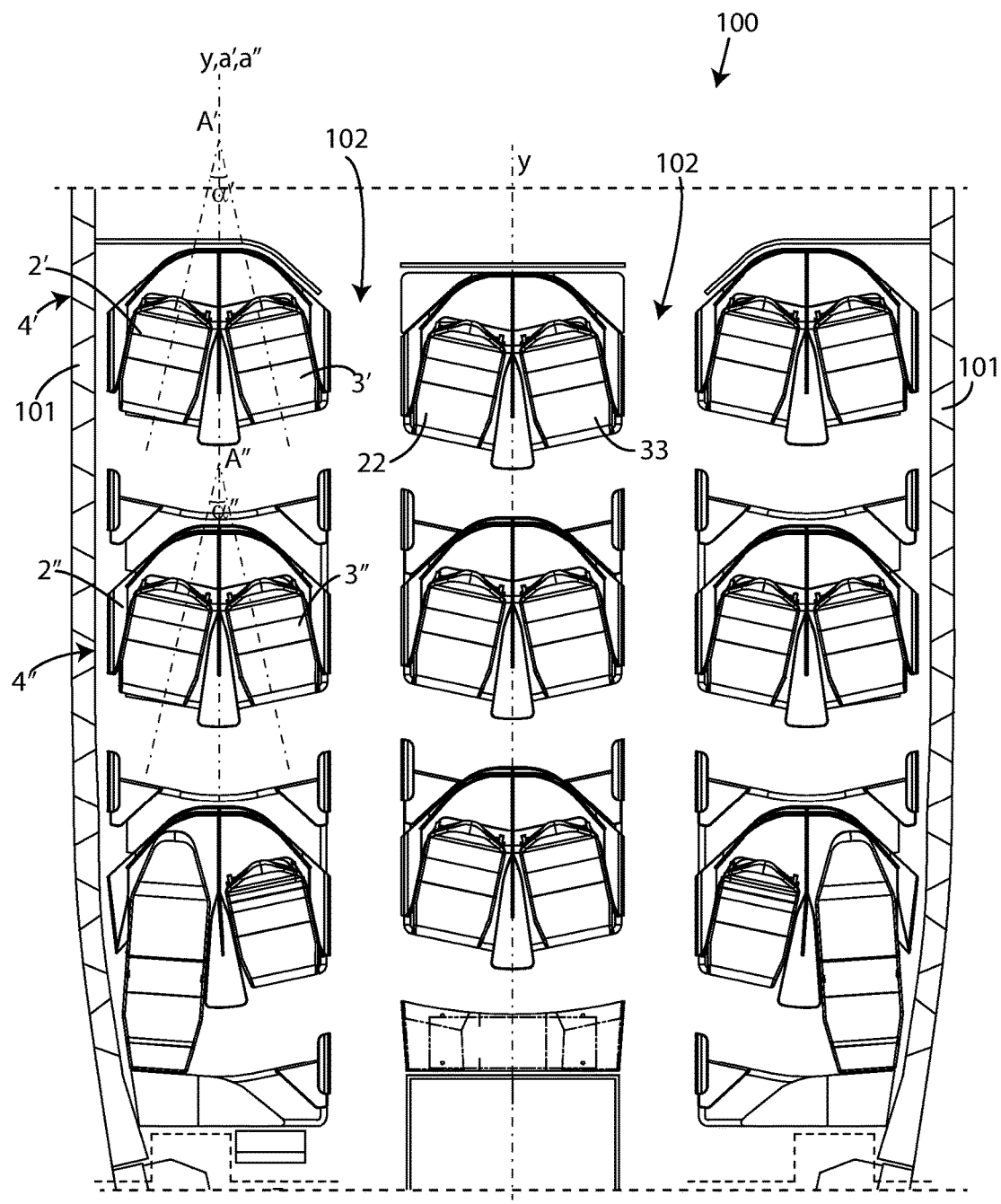
FIG. 7 shows a top view of a first example of the assembly arrangement according to the invention inside a cabin of an aircraft.

In FIG. 7 it is shown a possible arrangement of the assembly 1 of seats according to the invention inside a cabin 100 of an airplane. As known, a cabin 100 of an airplane generally provides two window sidewalls 101 and a central longitudinal axis y. The arrangement of FIG. 7 provides a central column of pairs of seats 2 - 3 substantially similar to the pairs of seats 2'-3' and 2"-3" of the seat assembly according to the invention described previously, in which it is not present the crossing space between consecutive seat rows, so as passengers of the two seats 22:33 have the ability to reach their seats directly from the two central aisles 102, formed between the three pillars of seat assemblies.

In correspondence of each side of the window wall 101 there are provided a plurality of assemblies 1 of seats according to the invention as described above in which the bisector a' or a" of the first angle α' or α" between the respective axes of recline r2'-r3' or r2"-r3" of said pair of adjacent seats 2'-3' or 2"-3" of each row 4' or 4" is parallel to the longitudinal axis y of the cabin 100 of the aircraft.

Alternatively, as shown in FIG. 8, bisector a' or a" of said first angle α' or α" between the respective axes of recline r2'-r3' and r2"-r3" of said pair of adjacent seats 2'-3' or 2"-3" of each row 4' or 4" is inclined with respect to said cabin 100 of a second angle β' or β" ranging between 2° and 20°, preferably of 8° with respect to the longitudinal axis y.

This allows to arrange the seats in such a way not to have the space between a seat 2' of a row 4' and a chair 2" of the front row 4" in correspondence of the sidewall of the window 101 and instead so as to have the space 8 in correspondence of adjacent seats 3' to the central aisle 102 to allow passengers to reach window seats 2', 2", without disturbing the person sitting in the aisle seat 3".

In the above, embodiments have been described and variants of the present invention have been described, but it is to be understood that one skilled in the art can introduce modifications and changes, without departing from the relevant scope, as defined by the enclosed claims.

The invention claimed is:

1. An assembly of seats for airplanes, said assembly comprising at least two rows of pairs of adjacent seats,
    each seat comprising one seatback, one sitting portion, and an element for supporting lower limbs of a passenger, each seat being configured to make a reclining movement along a respective recline axis between a sitting position, wherein at least said one seatback and said one sitting portion cooperate to form a sitting element, and an extended position, wherein said one seatback, said one sitting portion and said element cooperate to form a bed surface,
    each seat being tilted with respect to an adjacent seat at a first angle defined by the intersection of the respective recline axes at a convergence point arranged rearward of a pair of adjacent seats,
    at least a first seat of a first row being separated from a seat of a second row arranged in front of it so that, when (a) the first seat of a first row and the seat of the second row are in the sitting position or (b) the first seat of the first row and the seat of the second row are in the extended position, there is always a space to permit passage of a passenger to access a seat adjacent to said first seat of said first row,
    wherein seats positioned directly adjacent an interior sidewall of an airplane cabin are never parallel to the longitudinal axis of the cabin; and
    wherein a pair of adjacent seats in the first row are spaced from a pair of adjacent seats in the second row in front of the first row so that at least a leg rest of a seat of the first row adjacent the sidewall is stacked with respect to the seatback of the seat in the second row.

2. The assembly of seats according to claim 1, wherein said first angle is between 1° and 25°.

3. The assembly of seats according to claim 2, wherein said element for the support of the lower limbs of each seat is coupled to the respective sitting portion and is configured to be pulled out in order to assume a position of maximum extraction when the respective seat is in the extended position.

4. The assembly of seats according to claim 2, wherein said element for the support of the lower limbs of each seat comprises a foot-rest portion separated from said seat portion so that when said seat is in the extended position, said seat portion and said foot-rest portion cooperate in order to form said bed surface.

5. The assembly of seats according to claim 2, wherein said first angle is equal to 12°.

6. The assembly of seats according to claim 1, wherein when said at least a first seat is in an extended position, the distance between said element for said at least a first seat and said seat of said second row arranged in front of it, is at least between 4 and 12 inches.

7. The assembly of seats according to claim 6, wherein when said at least one first seat is in extended position, the distance, between said element for the support of the lower limbs of said at least a first seat and said seat of said second row arranged in front of it, is 7 inches.

8. The assembly of seats according to claim 1, wherein said element for the support of the lower limbs of each seat is coupled to the respective sitting portion and is configured to be pulled out in order to assume a position of maximum extraction when the respective seat is in the extended position.

9. The assembly of seats according to claim 1, wherein said element for the support of the lower limbs of each seat comprises a foot-rest portion separated from said seat portion so that when said seat is in the extended position, said seat portion and said foot-rest portion cooperate in order to form said bed surface.

10. The assembly of seats according to claim 9, wherein said element for the support of the lower limbs of each seat comprises a leg-rest portion coupled to said seat portion, said leg-rest portion having a dimension so as to occupy the space between said seat portion and said foot-rest portion allowing the respective seat to assume the bed surface.

11. The assembly of seats according to claim 9, wherein said foot-rest portion has an element for the support of a monitor.

12. The assembly of seats according to claim 9, wherein each pair of adjacent seats of said second row has a common platform on top of which said seats lie and in that said foot-rest portions of the seats of said first rear row are coupled to said platform.

13. The assembly of seats according to claim 1, wherein between said pairs of adjacent seats of a same row is arranged a central element having a substantially triangular shape having an apex facing said convergence point of the respective recline axes of the respective pair of adjacent seats.

14. The assembly of seats according to claim 13, wherein said central element is, at least one of, (a) suitable for being used as an armrest for both said adjacent seats and (b) contains an extractable table for each seat of said adjacent seats.

15. The assembly of seats according to claim 1, wherein each row of seats comprises a dividing wall arranged rearwardly of said pair of seats.

16. An arrangement of airplane seats inside an airplane cabin, said cabin having a longitudinal axis and two window sidewalls, said arrangement including an assembly of seats comprising:
- at least two rows of pairs of adjacent seats,
- each seat comprising one seatback, one sitting portion, and an element for supporting lower limbs of a passenger, each seat being configured to make a reclining movement along a respective recline axis between a sitting position, wherein at least said one seatback and said one sitting portion cooperate to form a sitting element, and an extended position, wherein said one seatback, said one sitting portion and said element cooperate to form a bed surface,
- each seat being tilted with respect to an adjacent seat at a first angle defined by the intersection of the respective recline axes at a convergence point arranged rearward of a pair of adjacent seats,
- at least a first seat of a first row being separated from a seat of a second row arranged in front of it so that, when (a) the first seat of a first row and the seat of the second row are in the sitting position or (b) the first seat of the first row and the seat of the second row are in the extended position, there is always a space to permit passage of a passenger to access a seat adjacent to the first seat of said first row,
- wherein a bisecting line of said first angle between the respective recline axes of said pair of adjacent seats of each row is parallel to the longitudinal axis of said cabin, wherein seats positioned directly adjacent an interior sidewall of an airplane cabin are never parallel to the longitudinal axis of the cabin; and wherein a pair of adjacent seats in the first row are spaced from a pair of adjacent seats in the second row in front of the first row so that at least a leg rest of a seat of the first row adjacent the sidewall is stacked with respect to the seatback of the seat in the second row.

17. The arrangement of airplane seats according to claim 16, wherein said assembly of seats is arranged in correspondence of at least one of the windows sidewalls of said cabin forming a side column of seats.

18. The arrangement of seats according to claim 17, comprising a central column of seats comprising a plurality of rows of pairs of adjacent seats in order to form a central aisle between each respective side and central column of seats.

19. An arrangement of airplane seats inside an airplane cabin, said cabin having a longitudinal axis and two window sidewalls, said arrangement including an assembly of seats comprising:
- at least two rows of pairs of adjacent seats,
- each seat comprising one seatback, one sitting portion, and an element for supporting lower limbs of a passenger, each seat being configured to make a reclining movement along a respective recline axis between a sitting position, wherein at least said one seatback and said one sitting portion cooperate to form a sitting element, and an extended position, wherein said one seatback, said one sitting portion and said element cooperate to form a bed surface,
- each seat being tilted with respect to an adjacent seat at a first angle defined by the intersection of the respective recline axes at a convergence point arranged rearward of a pair of adjacent seats,
- at least a first seat of a first row being separated from a seat of a second row arranged in front of it so that, when (a) the first seat of a first row and the seat of the second row are in the sitting position or (b) the first seat of the first row and the seat of the second row are in the extended position, there is always a space to permit passage of a passenger to access a seat adjacent to the first seat of said first row,
- wherein the bisecting line of said first angle between the respective recline axes of said pair of adjacent seats of each row is tilted with respect to the longitudinal axis of said cabin of a second angle between 2° and 20°, wherein seats positioned directly adjacent an interior sidewall of an airplane cabin are never parallel to the longitudinal axis of the cabin; and wherein a pair of adjacent seats in the first row are spaced from a pair of adjacent seats in the second row in front of the first row so that at least a leg rest of a seat of the first row adjacent the sidewall is stacked with respect to the seatback of the seat in the second row.

20. The arrangement of airplane seats according to claim 19, wherein the second angle equals 8°.

* * * * *